United States Patent
Marinescu

(10) Patent No.: US 7,350,040 B2
(45) Date of Patent: Mar. 25, 2008

(54) METHOD AND SYSTEM FOR SECURING METADATA TO DETECT UNAUTHORIZED ACCESS

(75) Inventor: Adrian Marinescu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 11/072,356

(22) Filed: Mar. 3, 2005

(65) Prior Publication Data

US 2006/0200677 A1 Sep. 7, 2006

(51) Int. Cl.
*G06F 12/00* (2006.01)
(52) U.S. Cl. .............. 711/156; 711/152; 711/154; 711/163; 711/216; 726/25; 726/26
(58) Field of Classification Search ........... 711/156, 711/152, 154, 163, 216; 726/25, 26
See application file for complete search history.

(56) References Cited

U.S. PATENT DOCUMENTS

| | | | | |
|---|---|---|---|---|
| 4,028,667 | A * | 6/1977 | Breslau et al. ............ | 709/225 |
| 5,559,980 | A * | 9/1996 | Connors et al. ............ | 711/100 |
| 5,664,095 | A * | 9/1997 | Cox et al. ................. | 714/47 |
| 5,765,187 | A * | 6/1998 | Shimizu et al. ............ | 711/110 |
| 6,205,553 | B1 * | 3/2001 | Stoffel et al. ............. | 726/7 |
| 6,418,242 | B1 * | 7/2002 | Maurer ..................... | 382/266 |
| 6,418,527 | B1 * | 7/2002 | Rozenshein et al. ....... | 712/208 |
| 6,832,302 | B1 * | 12/2004 | Fetzer et al. .............. | 711/170 |
| 7,111,278 | B1 * | 9/2006 | Siska, Jr. .................. | 717/106 |
| 2002/0083032 | A1 * | 6/2002 | Bourges-Sevenier ....... | 707/1 |
| 2004/0071136 | A1 * | 4/2004 | Laumen et al. ............ | 370/390 |
| 2005/0076331 | A1 * | 4/2005 | Das et al. .................. | 717/114 |
| 2006/0161988 | A1 * | 7/2006 | Costea et al. .............. | 726/25 |

* cited by examiner

*Primary Examiner*—Stephen C. Elmore
(74) *Attorney, Agent, or Firm*—Christensen O'Connor Johnson Kindness PLLC

(57) ABSTRACT

Generally described, embodiments of the present invention provide a system and method for protecting a computer from malicious attacks and buffer overrun (intentional or unintentional). In particular, embodiments of the present invention protect the contents of block headers of data blocks and enable the ability for a memory manager to determine if a portion of a block header has been modified. In accordance with one aspect of the present invention, a method for securing data having a plurality of fields is provided. The method includes grouping the plurality of fields into at least a first group and a second group and generating a first identifier for the first group and a second identifier for the second group. Additionally, the first and second groups are encoded to protect the information contained in the fields of the groups. Still further, the first and second identifiers may also be encoded into the groups.

20 Claims, 6 Drawing Sheets

METHOD AND SYSTEM FOR SECURING METADATA TO DETECT UNAUTHORIZED ACCESS

FIELD OF THE INVENTION

In general, the present invention relates to computers and computer data and, in particular, to a system and method for encoding block metadata.

BACKGROUND OF THE INVENTION

Currently, memory of a computer is managed by a portion of the computer's operating system, generally referred to herein as a "memory manager." When a computer program or other computing application (collectively referred to herein as an "application") needs memory to perform operations, store data, or perform other functions, it requests the needed memory from the memory manager by providing the memory manager with an identification of the amount of memory needed. The memory manager, in return, allocates the requested amount of memory (referred to herein as a "block"), generates a block header that identifies and describes the block, and allows the requesting application access to the allocated memory. The block header generally includes several fields that are created by the memory manager and used by the memory manager to manage the memory. For example, fields of a block header may include a representation of the size of the block, a representation of a link to a previous block, block flags, unused bytes, and other internal block states.

The block size may include an identification of the size of the block that is allocated in response to a memory request. The flags field may be used by the memory manager to identify whether the block is busy, free, internally allocated, etc. The unused bytes may identify to the memory manager the bytes of the allocated block that are unused by the requesting application. In general, the fields of a block header are used by the memory manager and are intended to be private and modified only by the memory manager. Additionally, fields of a block header may vary in content, number, and size.

FIG. 1 is a block diagram of a portion of a memory region including two allocated blocks 101 and 102. Each block 101, 102 includes a block header that includes metadata, segmented into fields, that identifies the block. For example, block 102 includes a block header 103. Block header 103 includes metadata about the block 102 that is segmented into six fields 105, 107, 109, 111, 113, 115. Each of the fields 105, 107, 109, 111, 113, 115 include information that is used by the memory manager to manage block 102.

While the use of block headers make the management of data more efficient, it potentially exposes the computing system to attacks and unintended errors. For example, an application may request a particular amount of memory, be allocated that amount of memory, but write a larger amount of data than the allocated memory can hold. Thus, the following block header, and potentially a portion of the following data of the next block, in a memory region may be overwritten, thereby creating inconsistency that may lead to unpredictable results. Writing more data than there is allocated memory is referred to generally as "buffer overrun." A buffer overrun may result from the inadvertent improper coding of an application. However, buffer overruns may be intentionally programmed in an effort to take control of a portion of memory and execute malicious code.

FIG. 2 is a block diagram of a memory region including two data blocks where malicious code has been written that results in a buffer overrun. Continuing with the region of memory discussed with respect to FIG. 1, an application may request a particular amount of memory that is needed to write data. In response, the memory manager may allocate a block of data 201 from a data region 200, generate a block header 216 for that block of data 201, and allow the requesting application to write to that block. As seen in FIGS. 1 and 2, the allocated block of data 201 may be adjacent in the memory region 200 to another allocated block of data 202, which also includes a block header 203 and a data block 217.

When access to the block 201 is granted, the application may inadvertently write more data than there is memory allocated, resulting in a buffer overrun that writes data over the block header 203 and possibly a portion of the data block 217 of the adjacent memory block 201. As some of the overwritten block header fields 205, 207, 209, 211, 213, 215 are used by the memory manager, it may notice the inconsistencies and avoid unpredictable results by performing actions like raising exceptions, terminating the application, logging an error, etc.

Creators of malicious code may attempt to hide an intentional buffer overrun from the memory manager so that the overrun is not detected or prevent the application from crashing due to inconsistencies in an effort to take control over the application. One technique for hiding a buffer overrun is attempting to restore particular fields of the block header. In particular, creators of malicious code can predict which fields of a block header may result in the memory manager detecting a buffer overrun and terminate the application before the malicious code is able to take control. Using that knowledge, good values may be predicted for those fields and data may be included in the buffer overrun at the location of those fields that will attempt to restore those fields. For example, if a writer of malicious code is able to predict that the memory manager will detect a buffer overrun if field 3 209 and field 4 211 are changed, based on that knowledge, the buffer overrun can be created such that the data written to the location of those fields is the same as the data originally included in those fields.

If the malicious code is successful in hiding a buffer overrun by predicting good values for particular fields 209 and 211, it may be able to modify other fields in the block header 205, 207, 213, and 219 so that when those fields are accessed by the memory manager, the malicious code can take control of the application and potentially cause an intended harmful result to the computer, such as executing a piece of malicious code in a target application.

Accordingly, there is a need for a system and method that may be used to detect attempted buffer overruns before they can be exploited by malicious code. Such a system and method would be beneficial in protecting a computer from malicious attacks, as well as provide the ability to detect inadvertent programming flaws early in application development, without having to pay the overhead of other debugging methods that affect performance, memory usage, etc.

SUMMARY

Generally described, embodiments of the present invention provide a system and method for detecting if a computer is under a malicious attack and detecting a buffer overrun. Additionally, embodiments of the present invention mitigate the risk of malicious code exploiting a buffer overrun and other defects related to the use of memory manager functions. In particular, embodiments of the present invention protect the contents of block headers of data blocks and enable the ability for a memory manager to determine if a portion of a block header has been modified.

In accordance with one aspect of the present invention, a method for securing data having a plurality of fields is provided. The method includes grouping the plurality of fields into at least a first group and a second group, and generating a first identifier for the first group and a second identifier for the second group. Additionally, the first and second groups are encoded to protect the information contained in the fields of the groups. Still further, the first and second identifiers may also be encoded into the groups.

In accordance with another aspect of the present invention, a computer system having a computer-readable medium including a computer-executable program therein for performing the method of proving access to at least a portion of data, wherein the data is divided into a plurality of groups, is provided. The method performed includes receiving an access request for a portion of data and determining at least one group of the plurality of groups of data corresponding to the access request. The determined groups are then decoded and optionally verified if an identifier was previously created for the decoded group. After the decoded groups are verified, access to the portion of data is allowed.

In accordance with yet another embodiment of the present invention, a computer-accessible medium having instructions stored thereon that direct a computing system to: group a plurality of fields of a block header into a least two groups, generate a first identifier for the first group of the at least two groups, encode the first group and the first identifier; and encode the second group, is provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
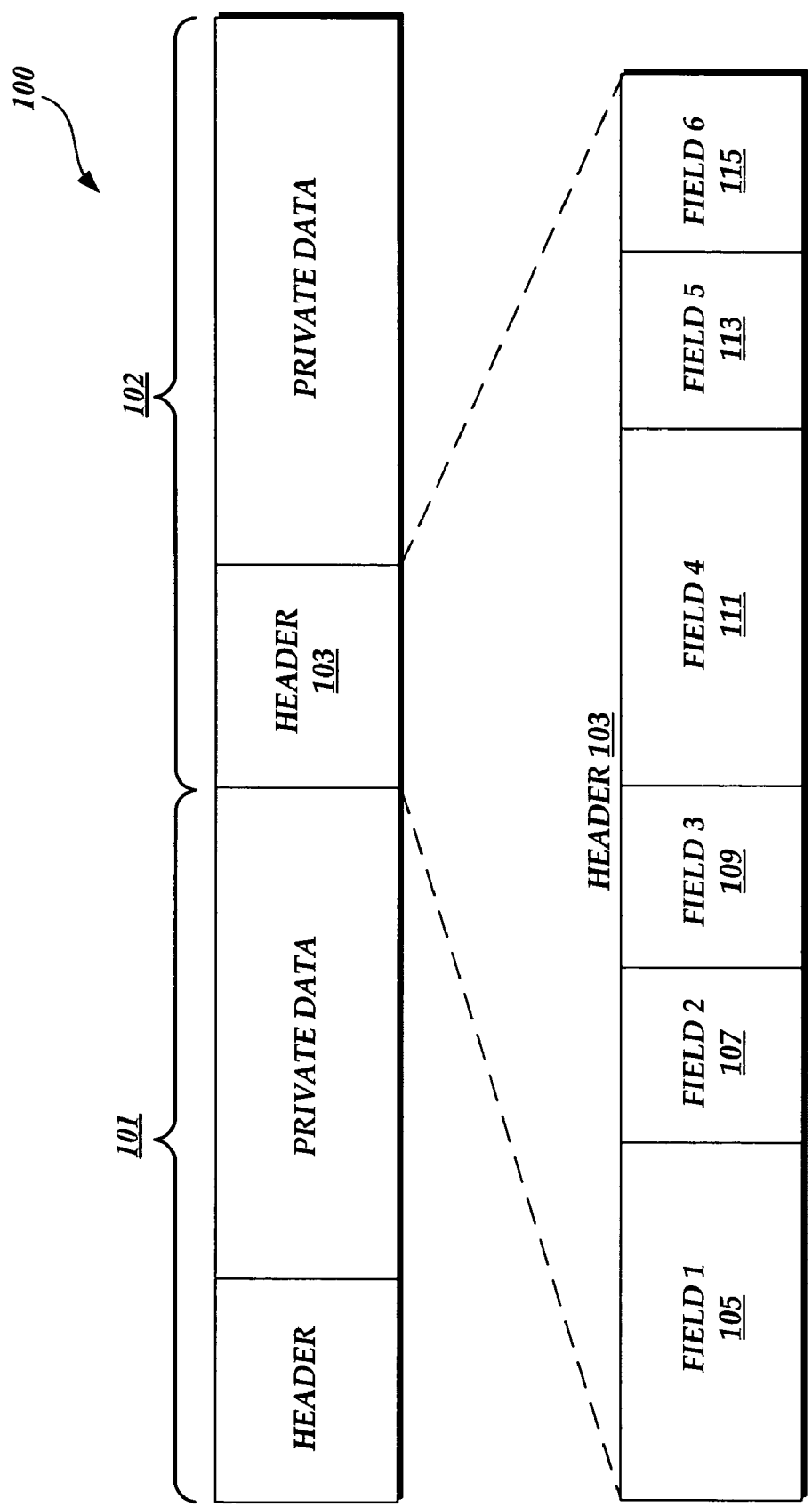
FIG. 1 is a block diagram of a portion of a memory region including two allocated blocks.
Figure 2:
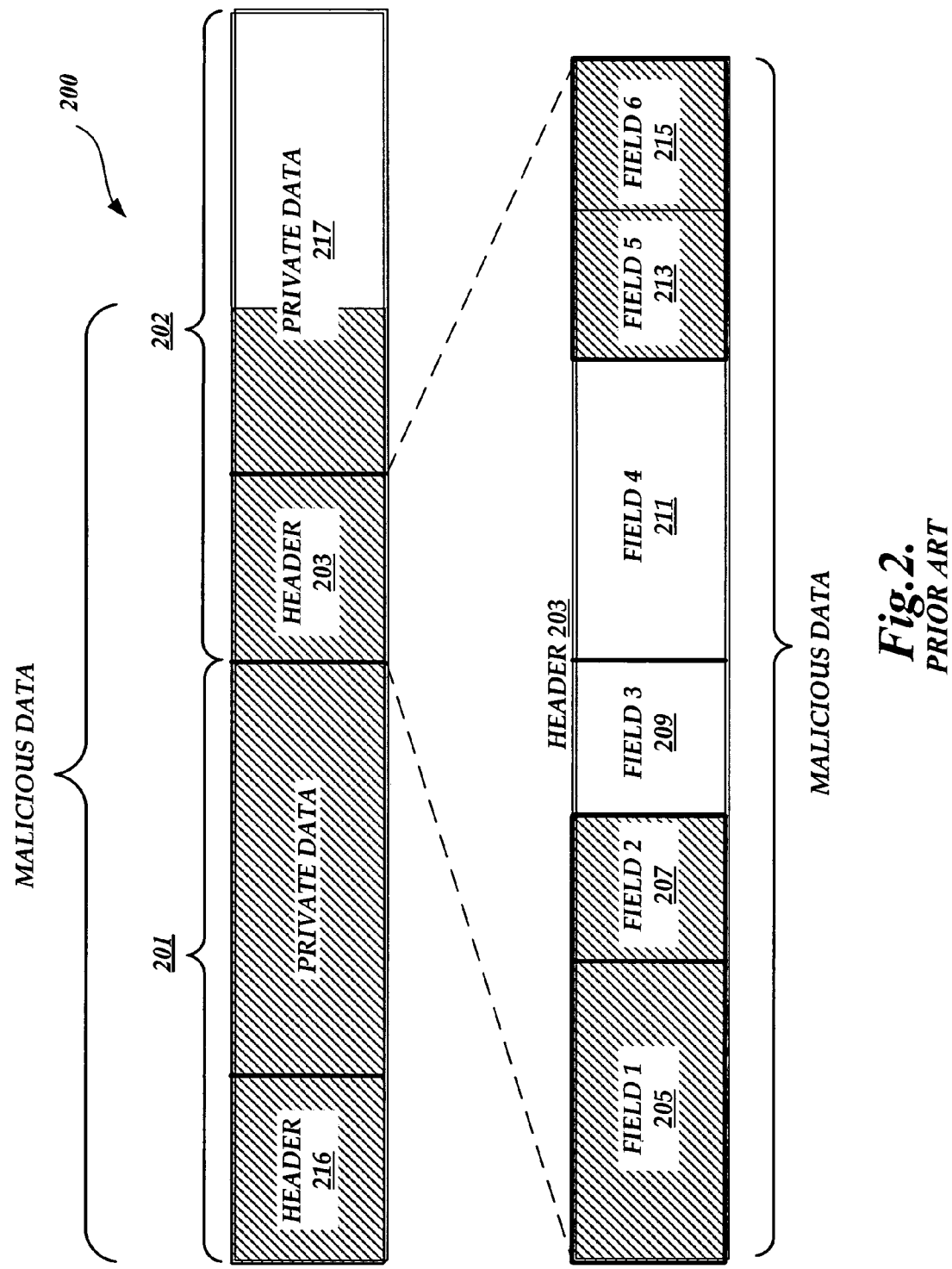
FIG. 2 is a block diagram of a memory region including two data blocks where malicious code has been written that results in a buffer overrun.
Figure 3:
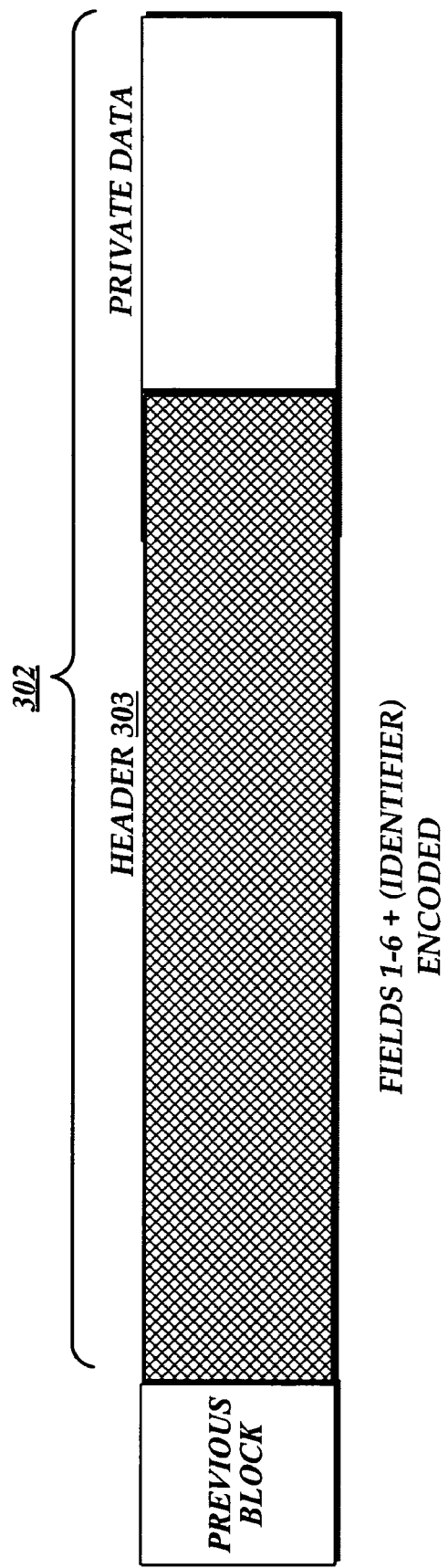
FIG. 3 is a block diagram of an encoded block header, encoded to detect corruption of the header metadata resulting from buffer overruns and other attempts at unauthorized access, either unintentional or malicious, as well as mitigate the potential of malicious code exploiting other weaknesses resulting from memory manager functions, in accordance with an embodiment of the present invention.

FIG. 3 is a block diagram of an encoded block header, encoded to detect corruption of the header metadata resulting from buffer overruns and other attempts at unauthorized access, as well as mitigate the potential of malicious code exploiting other weaknesses resulting from memory manager functions, either unintentional or malicious, in accordance with an embodiment of the present invention. In addition, the embodiment described with respect to FIG. 3 may be used to identify programming errors without the need of complex debugging overhead to identify buffer overflows.

In such an embodiment, all of the fields of a block header 303 are encoded using any type of encoding technique, such as encryption, thereby increasing the difficulty at predicting and/or discovering the values and locations of the individual fields of the header. To predict good values based on past viewing of fields, the fields would have to be decoded to determine the values contained in those fields. As discussed below, because all encoding and decoding is performed by the memory manager, the integrity and secrecy of the encoding technique can be maintained to a high degree as there is no need to share encoding/decoding algorithms and/or encoding/decoding keys.

While embodiments described herein include grouping fields of a block header having six fields, it will be appreciated that any number of fields may be included in a header and grouped. Additionally, the fields may be of any size, the fields may be of the same or different sizes, and each field may be dynamically generated based on the memory manager's needs.

Encoding the fields also increases the difficulty of writing good values, even if predicted, to particular fields. In particular, even assuming good values are determined, the buffer overrun data would have to be encoded using the proper encoding algorithm and key that was used to encode the original values. If the encoding is inaccurate, even if the values are accurate, when decoded by the memory manager, the intended values would not be generated and the memory manager would detect the modification, thereby terminating the application before the malicious code had the opportunity to take control.

Examples of encoding techniques include, but are not limited to, symmetric (private key) encryption. However, because the memory manager is the only program that is intended to be able to encode and/or decode the block header, there is no need to share the private keys and or the algorithm used to encode the information. Additionally, the key used and/or the algorithm used may be changed by the memory manager to further increase the difficulty of accessing and writing over block header data. For example, the encoding key and/or algorithm may be different for: different memory managers; different memory regions; different memory blocks; etc. Additionally, the encoding key and/or encoding algorithm may be changed periodically. For example, the encoding key and/or algorithm may be changed each time a header is encoded, e.g., daily, at startup, etc. While embodiments of the present invention will be described with respect to encoding a block header using a form of private key encryption, it will be understood that any type of encoding technique may be used to encode block headers and the description provided herein is for explanation purposes only and is not to be read as limiting the scope of the present invention.

In addition to encoding the block header, prior to encoding, the fields of the header may be rearranged, thereby further increasing the difficulty of predicting the location for which predicted values should be written. For example, instead of organizing the fields in the same order for all block headers, e.g., fields 1-6, the fields may be reorganized prior to encoding such that they appear in the following order—field 3, field 6, field 1, field 2, field 5, field 4—or any other order. Similar to the encoding technique used, the fields may be periodically reorganized and may be different for each block header. For example, each time the header is encoded, prior to the encoding, the fields may be reorganized. Alternatively, the fields may be reorganized at any other time and placed in any order. Reorganizing fields of a block header further increases the difficulty of determining the location of fields and predicting the values of fields.

Still further, prior to encoding the block header, an identifier may be generated for the block header that is used by the memory manager to validate the block header when it is decoded. The identifier may be, for example, a checksum, a hash value, a randomly assigned number, etc. In the case of a checksum or hash value, the memory manager executes a formula on the block header and the value returned is stored as the identifier for that block header. This identifier may be stored with the header and encoded, stored separately (e.g., in a table) by the memory manager, or both stored with the header and encoded or stored separately by the memory manager. When validated, the same formula is executed on the block header to compute a new value and the stored value and new value are compared.

In the case of a random number, the random number is generated and stored with the header when encrypted and the memory manager also maintains a table containing the randomly generated number. When the block header is decoded, the random number stored with the header is validated by comparing it with the number stored by the memory manager. While checksum, hash, and random numbers have been described herein as identifiers used to validate a block header, it will be understood that any type of identifier may be used to validate a block header.

While rearranging the order of block header fields, encoding the header, and generating identifiers for the header increases the difficulty for block header metadata to be altered without detection, a complication with synchronization (locking) arises when attempting the perform multiple access on the fields of a block header. Thus, according to another embodiment of the present invention, the fields of a block header may be grouped and encoded separately.

Figure 4:
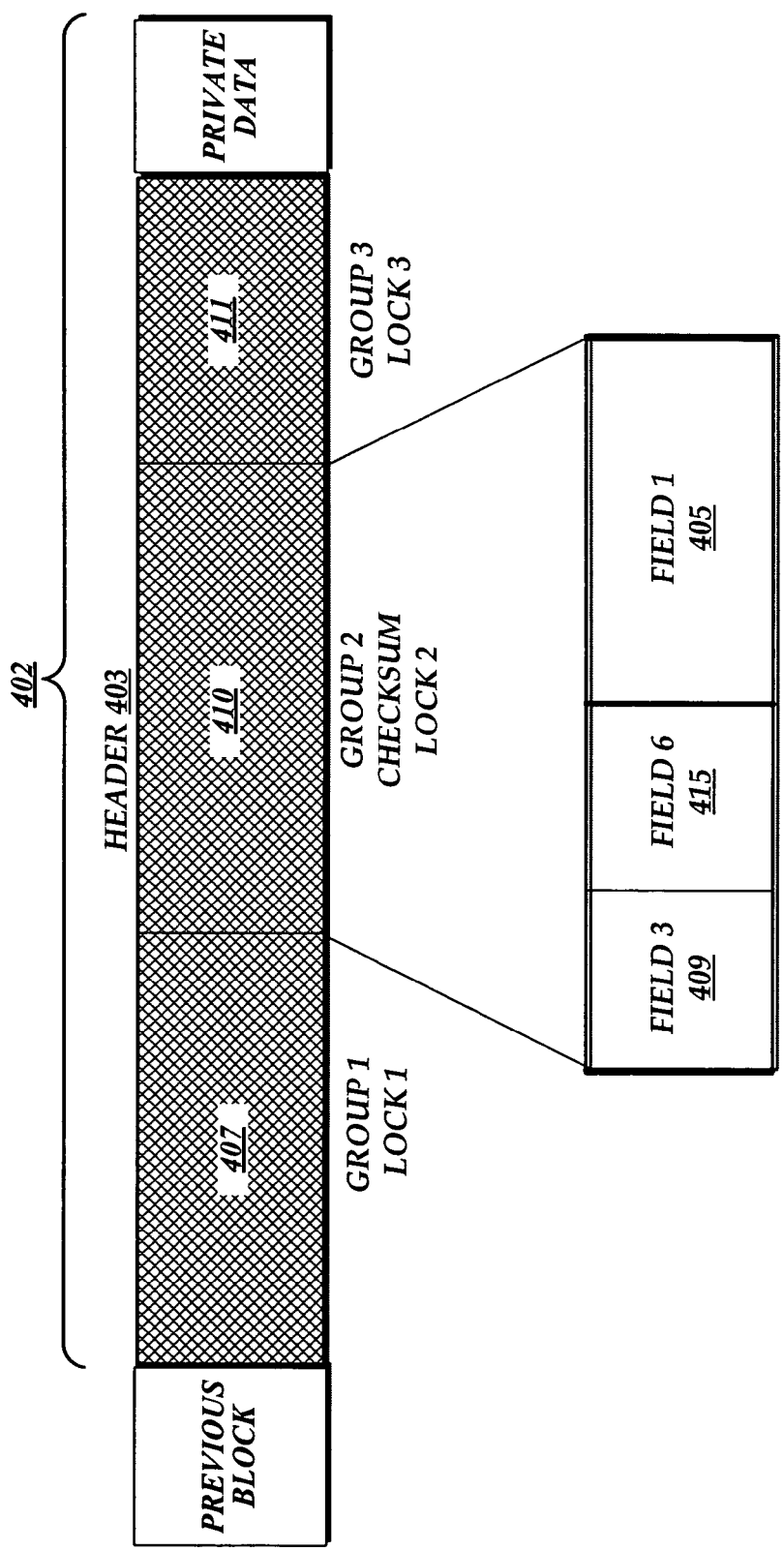
FIG. 4 is a block diagram of an encoded block header with the fields of the block header grouped and encoded separately, in accordance with an embodiment of the present invention.

FIG. 4 is a block diagram of an encoded block header with the fields of the block header grouped and encoded separately, in accordance with another embodiment of the present invention. The block header 403 for the data block 402 has the fields of the block header grouped and encoded separately. For example, field 3 409, field 6 415, and field 1 405 may be grouped and encoded together, while the other fields may be grouped and encoded in one or more other groups. As will be discussed in more detail below with respect to FIG. 5, the fields may be grouped based on access requirements, locking requirements, randomly grouped, or based on any other relationship between the fields.

Similar to the embodiment described with respect to FIG. 3, this embodiment may be used to identify programming errors early in the development phase as it will identify buffer overflows and other defects related to memory manager functions. Additionally, any number and/or size of fields may be grouped together.

Similar to generating an identifier for a header, an identifier may also be generated for each group that is stored with the group and/or stored by the memory manager. For example, Group1 407 may be hashed and a resulting hash value used as the identifier. That hash value may be stored by the memory manager separate from Group1 407. A checksum may be computed for Group2 410 that is stored with the fields of Group2 410. The remaining fields of the block header 403 may be included in a third group, Group3 411. For Group3 411 no identifier is assigned to the group. As discussed previously, any technique (e.g., checksum generation, hashing, or random number generation) may be used to generate an identifier for the groups, or no identifier may be computed for one or more groups.

In addition to optionally assigning an identifier to each group of the block header 403, the groups may be individually encoded using any type of encoding technique. Each group may be encoding using a different technique or different values/algorithms of the same technique may be used for each group. Continuing with the example of FIG. 4, groups may be encoded using private key encryption using different algorithms and/or keys to encode each group. For example, the memory manager may maintain a first algorithm and key that is used when encoding fields that correspond to a particular locking requirement and a separate algorithm and key for encoding fields that correspond to another locking requirement. Additionally, not all of the groups need to be encoded. Thus, groups that are accessed frequently that are easily detected if modified may remain decoded, while other groups may be encoded.

As is well known in the art of memory management, multiple locks may be used to control concurrent access to memory. For example, an exclusive lock may be used only to allow access by one application until that lock is released. Alternatively, a non-exclusive, or shared lock, may be used to allow concurrent access to memory by multiple execution threads, as long as the lock is not exclusively owned. Typically, the exclusive locks are used for granting write access to data structures, while shared locks are generally used to grant read access to data, while no writer can modify the data. Because there are several different locking schemes that may be used to control access to memory and embodiments of the present invention may be used with any type of locking scheme, locks and lock requirements will be referred to herein generally as Locks. Additionally, the difference between locks and/or locking requirements will be illustrated by referring to Lock 1, Lock 2, Lock 3, etc., wherein each numbered Lock illustrates a different lock or locking requirement.

Returning to the present example, the memory manager may maintain a first key and algorithm that corresponds to a Lock 1 and use that first key and algorithm to encode Group1 407, which includes fields that are related to Lock 1. Similarly, the memory manager may maintain a second key and algorithm that corresponds to Lock 2 and use that second key and algorithm to encode Group2 410. A third key and algorithm, which corresponds to Lock 3 may be used to encode Group3 411. While this illustrates a simple example of associating a single key and algorithm to different groups, wherein the fields are grouped according to locking requirements, many variations may be used in accordance with embodiments of the present invention.

For example, the memory manager may maintain a library of keys and algorithms that correspond to the different locking requirements and the actual key and/or algorithm used to encode a particular group of a block header may be randomly selected from the library each time the group is encoded.

Additionally, prior to encoding, the fields within a group 407, 409, 411 may also be arranged so that they appear in different orders. For example, field 1 405, field 3 409, field 6 415, all of which are in group2 410, may be arranged so that field 3 309 appears first, field 6 415 is second, and field 1 405 is last. The arrangement of the fields may be on a system basis, memory manager basis, block basis, use basis, etc. For example, each time a group is accessed by the memory manager, the fields of that group may be reorganized prior to being encoded again.

Figure 5:
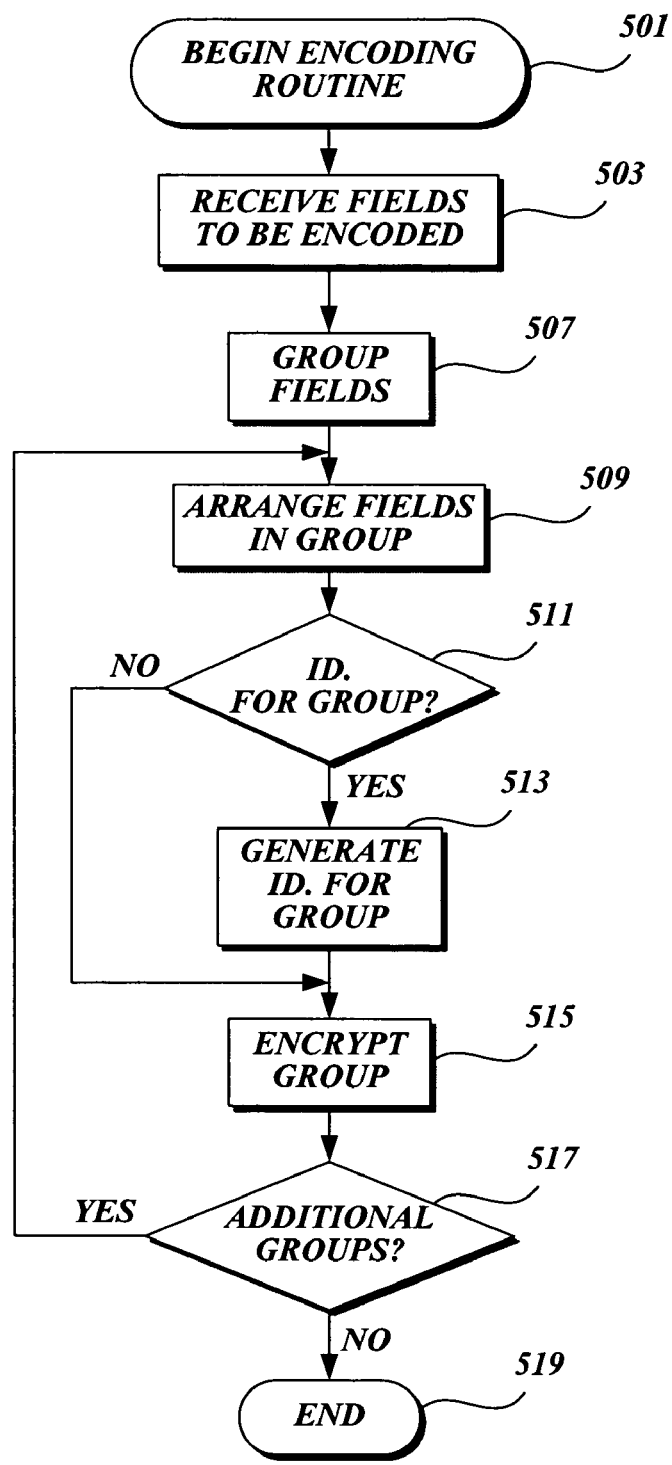
FIG. 5 is a flow diagram illustrating an encoding routine for encoding a group of fields, in accordance with an embodiment of the present invention.
Figure 6:
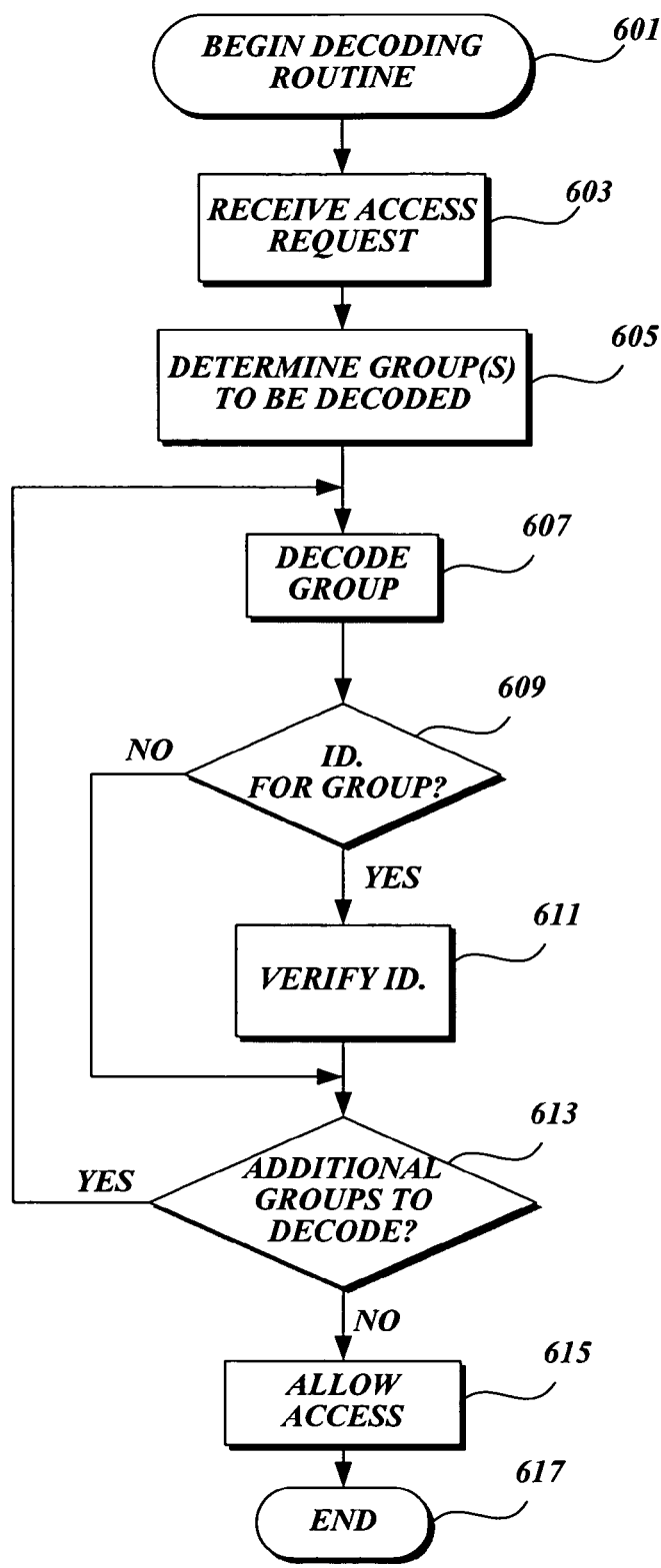
FIG. 6 is a flow diagram illustrating a decoding routine for decoding a group, in accordance with an embodiment of the present invention.

FIG. 5 is a flow diagram illustrating an encoding routine for encoding a group of fields, in accordance with an embodiment of the present invention. FIGS. 5-6 illustrate blocks for performing specific functions. In alternative embodiments, more or fewer blocks may be used. In an embodiment of the present invention, a block may represent a software program, a software object, a software function, a software subroutine, a software method, a software instance, a code fragment, a hardware operation, or a user operation, singly or in combination. The encoding routine 500 begins at block 501 and at block 503 the memory manager identifies fields of a block header to be encoded. The fields may be all fields of a block header that has been created by the memory manager as it is allocating memory in response to a memory request. Alternatively, the fields may be fields of an existing block header that have been previously decoded that are to be re-encoded.

In general it is beneficial to group fields based on some relationship. For example, fields may be grouped based on common locking requirements, based on those that are accessed at the same time, based on size, etc. For example, some fields of a block header may only be accessed using Lock 1, which is a particular locking requirement such as an exclusive lock; another group may be generally accessed based on Lock 2 requirements; and another group may be accessed based on Lock 3 requirements. Thus it may be determined that the fields of a block header are to be divided into three groups—one group for the fields accessed by Lock 1, one group for fields accessed by Lock 2, and a third group for fields accessed by Group 3.

At block 507, the fields are grouped in accordance with the relationship between fields. The fields may be grouped into one or more groups, depending on the security desired, the number of fields, the relationships between fields, and any architecture-specific limitations. All fields may be included into one group, which would represent the example discussed above with respect to FIG. 3. Alternatively, the fields may be grouped into multiple groups, or one or more fields may be included in a group by itself.

Referring back to FIG. 4, field 3 409, field 6 415, and field 1 405 are grouped together as they are all related. At block 509, the fields of a group are arranged to further obfuscate the arrangement and values of the fields and make prediction of values and field locations more difficult. As mentioned above, the fields of a group may be arranged in any order and according to any arrangement scheme. For example, the arrangement of fields in a group may be random, based on the size of the fields, the frequency at which the fields are accessed, based on the value contained in the fields, etc. For example, field 1 405, field 3 409, and field 6 415 of group 2 (FIG. 4) have been arranged such that field 3 409 appears first, field 6 415 appears second, and field 1 405 appears last. It will be appreciated that any arrangement scheme may be used for arranging fields in a group. Additionally, as mentioned above, the arrangement of the fields within a group may be changed periodically. For example, the fields of a group may be rearranged each time the field is encoded. If there are architecture-specific limitations that affect the grouping or arrangement of fields, the fields may be grouped and arranged in accordance with those limitations. For example, if restrictions are imposed with respect to accessing aligned fields or accessing a group of fields, the fields may be grouped and arranged in a manner to enable compliance with those restrictions.

At decision block 511, it is determined if an identifier is to be generated and associated with a group. If it is determined that an identifier is to be generated and associated with a group, at block 513, an identifier is generated. An identifier may be generated in any of a variety of ways. For example, the identifier may be, but is not limited to, a randomly generated number that is associated with the group, a hash value computed for the group, a checksum value computed for the group, etc. Additionally, in associating the identifier with the group, it may be stored with the fields of the group, included as a field in the group, maintained separate from the group by the memory manager, or both stored with the group and maintained separate from the group by the memory manger.

After an identifier has been generated at block 513, or if it is determined at decision block 511 that a identifier is not to be computed, at block 515 the group—and optionally, the identifier—is encoded. The encoding may be accomplished using any type of encoding technique. For example, the memory manager may maintain a list of secret keys and algorithms that are used to encode the group of data. Additionally, for each group of a header block, different encoding schemes, algorithms, and/or keys may be used.

At decision block 517, it is determined if there are additional groups to be encoded. If it is determined that there are additional blocks to be encoded, the routine 500 returns to block 509 and continues. However, if it is determined that there are no additional groups to encode, the routine 500 completes, as illustrated by block 519.

FIG. 6 is a flow diagram illustrating a decoding routine for decoding at least a portion of a block header, in accordance with an embodiment of the present invention. The decoding routine begins at block 601, and at block 603, the memory manager receives an access request for a memory block that includes an encoded header. At block 605, the memory manager determines which encrypted group or groups of the block header need to be decoded based on the access request. For example, if the access request requires an exclusive lock, the encoded group containing the field identifying the lock will need to be decoded.

Upon a determination of the group or groups to decode at block 605, at block 607, one of the determined groups is decoded using the appropriate decoding technique. The appropriate decoding technique corresponds to the technique used to encode the group. Such information is maintained by the memory manager as it is the program that encoded the group. For example, if the group was encoded using a secret key and a particular algorithm, the secret key and corresponding decoding algorithm are used to decode the group. Upon decoding the group, at decision block 609, it is determined if the group is to be verified based upon an identifier assigned to the group. If the decoded group includes an identifier, or if an identifier is assigned to the group and maintained by the memory manager, the identifier is verified, as illustrated by block 611. For example, if a hash value was computed for the group and included in the encoded group, a hash value may be again computed for the group after it is decoded and compared to the hash value included with the group. If the two hash values are the same, the group has not been modified by a buffer overrun. However, if the hash values are not the same, the group has been modified and the memory manager can deny the request and terminate the application, thereby reducing the likelihood that malicious code can remain hidden and potentially take control.

Once the contents of the decoded group have been verified at block 611, or if it is determined at decision block 609 that the contents are not to be verified, at decision block 613, it is determined if there are other groups to be decoded in response to the access request. If it is determined that there are additional groups to be decoded, the routine 600 returns to block 607 and continues. However, if it is determined that there are no additional groups to decode, at block 615, the routine continues and the memory manager is allowed access to the fields of the decoded groups. Additionally, in response to the allowed access, the memory manager may modify some or all of the fields that have been decoded. After the appropriate groups have been decoded and access granted to the memory manager, the routine completes as illustrated by block 617.

While embodiments of the invention have been illustrated and described, it will be appreciated that various changes can be made therein without departing from the spirit and scope of the invention.

I claim:

1. A method implemented by a memory manager to secure data for storage in memory of a computer, the data having a plurality of fields, the method comprising:
grouping the plurality of fields into at least a first group of one or more fields and a second group of one or more fields;
generating a first identifier for the first group and a second identifier for the second group, the first and second identifiers for use in detecting unauthorized access to the first and second groups of data, respectively; and
separately encoding the first group of one or more fields and the second group of one or more fields to secure the data.

2. The method of claim 1, wherein the first group includes at least two of the plurality of fields, the method further comprising:
in response to grouping the plurality of fields, arranging the at least two fields of the first group.

3. The method of claim 1, wherein the first identifier is encoded with the first group.

4. The method of claim 1, wherein the data is a header data.

5. The method of claim 1, wherein the plurality of fields are fields of a data block header.

6. The method of claim 1, wherein grouping the plurality of fields includes:
grouping the fields according to a determined relationship between the plurality of fields.

7. The method of claim 1, wherein grouping the fields includes:
grouping the fields in a random order.

8. The method of claim 1, wherein the first identifier is a checksum generated for the group.

9. A computer system providing access to encoded data in memory, wherein the encoded data is divided into a plurality of groups, the system comprising:
a memory manager coupled to the memory, the memory manager implementing a computer-executable program for:
receiving an access request for a portion of the encoded data;
determining at least one group of the plurality of groups of encoded data corresponding to the access request, wherein the determined at least one group includes an identifier;
decoding the determined at least one group;
verifying the identifier of the decoded at least one group; and
allowing access to the decoded at least one group.

10. The computer system of claim 9, wherein at least one of the plurality of groups includes a plurality of fields and wherein determining at least one group includes:
identifying a field of the plurality of fields corresponding to the access request; and
determining at least one group based on the identified field.

11. The computer system of claim 9, wherein decoding the determined at least one group includes:
decoding the determined at least one group using a decoding algorithm selected from a plurality of decoding algorithms.

12. The computer system of claim 9, wherein decoding the determined at least one group includes:
decoding the determined at least one group using a decoding key selected from a plurality of decoding keys.

13. The computer system of claim 9, wherein verifying the identifier of the decoded at least one group includes:
generating an identifier representative of the decoded group and comparing the generated identifier to the identifier of the decoded group.

14. The computer system of claim 13, wherein the known identifier is included in the decoded group.

15. The computer system of claim 13, wherein the generated identifier is a checksum.

16. The computer system of claim 13, wherein the known identifier is a checksum previously generated for the group.

17. A computer-accessible medium having instructions stored thereon that when implemented by a memory manager of a computing system for securing data for storage in memory of the computing system direct the memory manager to:
group a plurality of fields of a block header of the data into at least two groups, each group comprising one or more fields of the block header;
generate a first identifier for the first group of the at least two groups, the first identifier for use in detecting unauthorized access to the first group of one or more fields;
encode the first group of one or more fields and the first identifier; and
separately encode the second group of one or more fields to secure the data.

18. The computer-accessible medium of claim 17, wherein the first group includes at least two fields and wherein the fields are arranged in a random order.

19. The computer-accessible medium of claim 17, wherein the first group and first identifier are encoded using a first encryption algorithm and the second group is encoded using a second algorithm.

20. The computer-accessible medium of claim 17, wherein the first group and first identifier are encoded using a first encryption key and the second group is encoded using a second encryption key.

* * * * *